US011279863B2

(12) United States Patent
Gupta et al.

(10) Patent No.: US 11,279,863 B2
(45) Date of Patent: Mar. 22, 2022

(54) THERMOASSOCIATIVE POLYMERS IN SUBTERRANEAN TREATMENT FLUIDS

(71) Applicant: Halliburton Energy Services, Inc., Houston, TX (US)

(72) Inventors: Nivika Rajendra Gupta, Maharastra (IN); Bhau Anantha Kuchik, Maharastra (IN); Jay Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 172 days.

(21) Appl. No.: 16/605,982

(22) PCT Filed: Dec. 11, 2018

(86) PCT No.: PCT/US2018/064824
§ 371 (c)(1),
(2) Date: Oct. 17, 2019

(87) PCT Pub. No.: WO2020/122861
PCT Pub. Date: Jun. 18, 2020

(65) Prior Publication Data
US 2021/0246353 A1   Aug. 12, 2021

(51) Int. Cl.
*C09K 8/88* (2006.01)
*C09K 8/12* (2006.01)
(Continued)

(52) U.S. Cl.
CPC ............... *C09K 8/12* (2013.01); *C09K 8/88* (2013.01); *C09K 8/882* (2013.01); *C09K 8/885* (2013.01);
(Continued)

(58) Field of Classification Search
None
See application file for complete search history.

(56) References Cited

U.S. PATENT DOCUMENTS

2003/0114317 A1   6/2003   Benton et al.
2004/0266629 A1*  12/2004  Maroy .................. C09K 3/00
                                                507/200
(Continued)

FOREIGN PATENT DOCUMENTS

WO   2015/009612 A1   1/2015

OTHER PUBLICATIONS

International Preliminary Report on Patentability issued in related PCT Application No. PCT/US2018/064824 dated Jun. 24, 2021, 8 pages.
(Continued)

*Primary Examiner* — Andrew Sue-Ako
(74) *Attorney, Agent, or Firm* — Tenley Krueger; Baker Botts L.L.P.

(57) ABSTRACT

Compositions and methods for use in subterranean treatment fluids involving thermoassociative polymers are provided. In some embodiments, the methods include providing a treatment fluid that includes an aqueous base fluid, one or more thermoassociative polymers that include a water soluble polymeric backbone having one or more hydrophobic moieties attached to the polymer backbone, wherein the thermoassociative polymer exhibits thermoassociation at a first temperature $T_{assoc}$, and one or more tuning additives that changes the temperature at which at least one of the thermoassociative polymers exhibits thermoassociation from $T_{assoc}$ to a second temperature $T_{assoc}'$; and introducing the treatment fluid into a portion of a subterranean formation.

19 Claims, 3 Drawing Sheets

(51) Int. Cl.
*C09K 8/90* (2006.01)
*E21B 21/00* (2006.01)
*E21B 33/13* (2006.01)

(52) U.S. Cl.
CPC .............. *C09K 8/90* (2013.01); *E21B 21/003* (2013.01); *E21B 33/13* (2013.01)

(56) References Cited

U.S. PATENT DOCUMENTS

| | | | |
|---|---|---|---|
| 2005/0065038 A1* | 3/2005 | Weaver .................. | C09K 8/685 507/211 |
| 2005/0178546 A1* | 8/2005 | Reddy .................... | C09K 8/706 166/278 |
| 2007/0281869 A1 | 12/2007 | Drochon et al. | |
| 2010/0081586 A1* | 4/2010 | Smith .................... | C09K 8/584 507/213 |
| 2011/0053807 A1 | 3/2011 | Panga et al. | |
| 2012/0111570 A1 | 5/2012 | Smith et al. | |
| 2014/0262293 A1* | 9/2014 | Song ........................ | C09K 8/68 166/308.2 |
| 2018/0066172 A1* | 3/2018 | Vigano .................... | C09K 8/08 |

OTHER PUBLICATIONS

Gupta, Nivika R., Pallavi P. Ghute, and Manohar V. Badiger. "Synthesis and characterization of thermo-sensitive graft copolymer of carboxymethyl guar and poly (N-isopropylacrylamide)." Carbohydrate polymers 83.1 (2011): 74-80.

Gupta, Nivika R., et al. "Synthesis and characterization of PEPO grafted carboxymethyl guar and carboxymethyl tamarind as new thermo-associating polymers." Carbohydrate polymers 117 (2015): 331-338.

Gandhi, Arijit, et al. "Studies on thermoresponsive polymers: Phase behaviour, drug delivery and biomedical applications." asian journal of pharmaceutical sciences 10.2 (2015): 99-107.

International Search Report and Written Opinion issued in related PCT Application No. PCT/US2018/064824 dated Sep. 9, 2019, 11 pages.

\* cited by examiner

THERMOASSOCIATIVE POLYMERS IN SUBTERRANEAN TREATMENT FLUIDS

CROSS-REFERENCE TO RELATED APPLICATION

The present application is a U.S. National Stage Application of International Application No. PCT/US2018/064824 filed Dec. 11, 2018, which is incorporated herein by reference in its entirety for all purposes.

BACKGROUND

The present disclosure relates to compositions and methods for treating subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes. A drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

One relevant property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation. One issue associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a well bore.

One method that has been developed to control lost circulation involves the placement of lost circulation materials into the lost circulation zone. Conventional lost circulation materials may include fibrous, lamellated, or granular materials. The lost circulation materials may be placed into the formation, inter alia, as a separate lost circulation pill in an attempt to control and/or prevent lost circulation. For a number of reasons, use of lost circulation materials may not provide a desirable level of lost circulation control in all circumstances.

BRIEF DESCRIPTION OF THE FIGURES

These figures illustrate certain aspects of some of the embodiments of the present disclosure, and should not be used to limit or define the claims.

Figure 1:
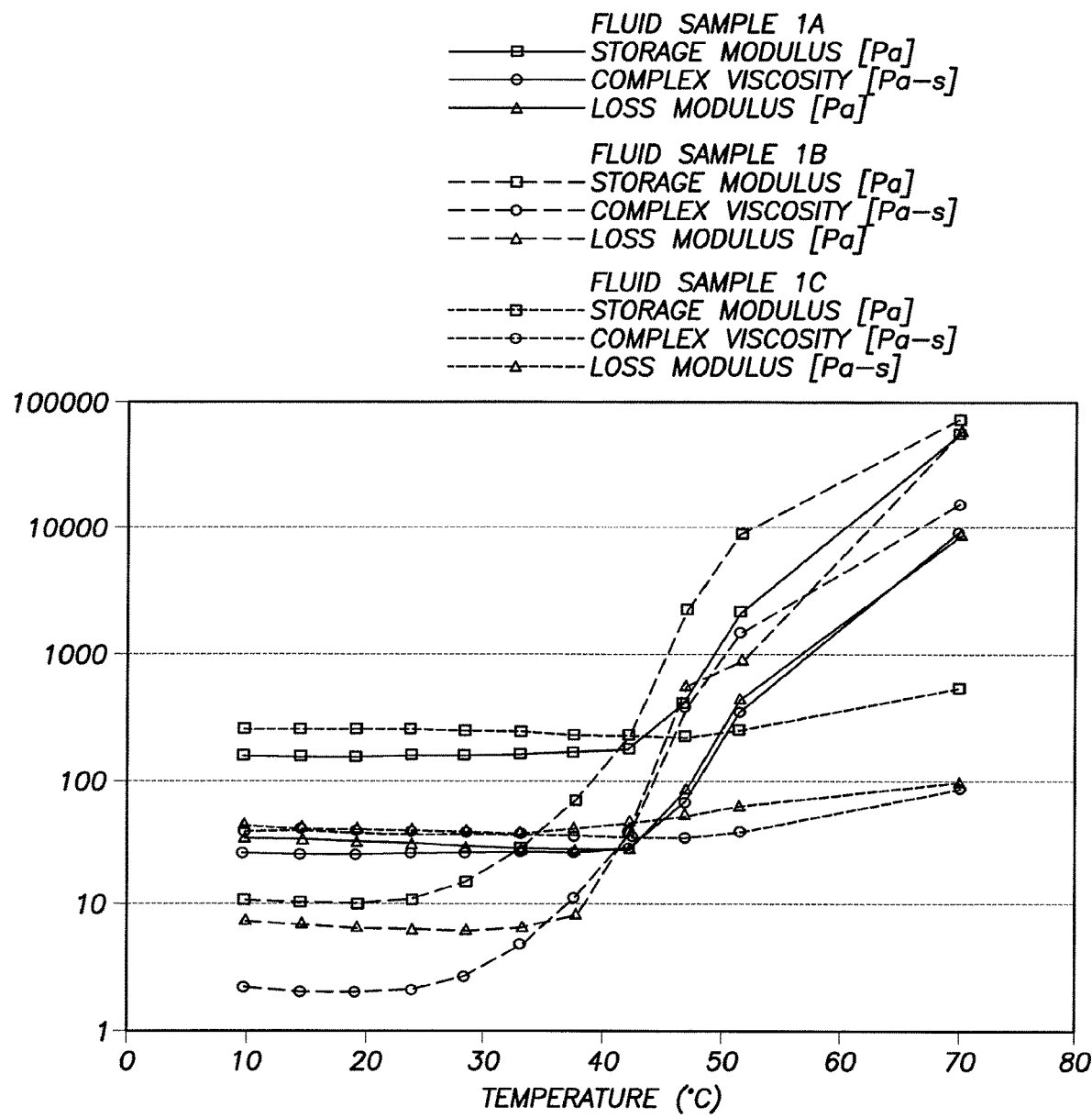
FIG. 1 is a graph illustrating data from tests of rheological properties of treatment fluids containing carboxymethyl guar-based thermoassociative polymers according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for treating subterranean formations. More particularly, the present disclosure relates to compositions and methods for use in subterranean treatment fluids involving thermoassociative polymers.

The present disclosure provides thermoassociative polymers that include a water soluble polymeric backbone onto which one or more hydrophobic moieties have been attached (e.g., grafted) to the polymer backbone. The methods of the present disclosure generally include: providing a treatment fluid that includes an aqueous base fluid and one or more thermoassociative polymers, the one or more thermoassociative polymers including a water soluble polymeric backbone having one or more hydrophobic moieties attached to the polymer backbone; and introducing the treatment fluid into a portion of a subterranean formation. In some embodiments, certain aspects of the thermoassociative polymers (e.g., chemical composition and/or molecular structure) and/or the treatment fluid containing those polymers (e.g., addition of one or more salts and/or surfactants) may be selected "tuned" such that the thermoassociative polymers alter the rheological properties of the treatment fluid at or near temperatures, e.g., temperatures that correspond to a temperature profile in a subterranean formation in which the treatment fluid will be used.

Among the many potential advantages to the methods and compositions of the present disclosure, only some of which are alluded to herein, the thermoassociative polymers of the present disclosure may enhance the rheological properties (e.g., increase viscosity) of treatment fluids in which they are included (e.g., drilling fluids) and/or reduce the loss of such fluids into a subterranean formation, for example, via intermolecular interactions that may be stimulated at certain temperatures. The viscosities of many conventional treatment fluids generally decrease at increased temperatures, which may be particularly problematic for treatments carried out in a wide range of temperatures. In some embodiments, the thermoassociative polymers of the present disclosure may be able to enhance (e.g., increase) the viscosity of a treatment fluid independent of its temperature, and in some instances may further increase the viscosity of the fluid at as its temperature increases. Thus, the treatment fluids of the present disclosure may be particularly useful in treatments where the fluid may encounter a wide range of temperatures. In some embodiments, the viscosity of treatment fluids that include thermoassociative polymers of the present disclosure may be reduced when the fluid is exposed to lower temperature, in some cases, without the need for external breakers. In some embodiments, the thermoassociative polymers of the present disclosure may be environmentally friendly and/or substantially or entirely biodegradable under certain conditions, such as those conditions typically found in subterranean formations.

The polymer backbone of the thermoassociative polymers of the present disclosure may include any water soluble polymer known in the art. In some embodiments, the guar and/or guar derivatives (e.g., carboxymethyl guar (CMG), carboxymethylhydroxypropyl guar (CMHPG), hydroxypropyl guar (HPG), and the like) may be used as the water soluble polymer backbone. In some embodiments, tamarind and/or tamarind derivatives (e.g., carboxymethyl tamarind (CMT), carboxymethylhydroxypropyl tamarind (CMHPT), hydroxypropyl tamarind (HPT), and the like) may be used as the water soluble polymer backbone. Other examples of water soluble polymers that may be suitable include, but are not limited to polyacrylates, polyacrylamides, polyanhydrides, polyethers, polyesters, polyamides, polyvinylalcohols, polysaccharides (e.g., starches, xanthan, diutan, scleroglucan, dextran, chitosan, pullulan, etc.), alginates, celluloses, any copolymers thereof, any derivatives thereof, and any combinations thereof. In some embodiments, any mixture of the aforementioned water soluble polymers may be used as the polymer backbone(s) of the thermoassociative polymers of the present disclosure.

The hydrophobic moieties in the thermoassociative polymers of the present disclosure may include any hydrophobic moieties known in the art. Examples of hydrophobic moieties that may be suitable include, but are not limited to, poly(ethylene oxide-co-propylene oxide) (PEPO), poly(N-isopropylacrylamide), poly(N,N-diethylacrylamide), poly(ethylene oxide) (PEO), poly(propylene oxide) (PPO), polyvinylmethylether (PVME), poly(acrylic acid)-g-poly(ethylene oxide), poly(acrylic acid)-g-poly(N-isopropylacrylamide), poly(N-vinylcaprolactam), poly(pentapeptides) of elastin, poly(acrylic acid) (PAA), polyacrylamide (PAAm), poly(acrylamide-co-butyl methacrylate), poly(2-(dimethylamino)ethyl methacrylate), poly(methyl vinyl ether), poly(N-vinylcaprolactam), polyampholytes, poly(2-(dimethylamino)ethyl methacrylate) (PDMAEMA), any copolymers (e.g., block copolymers) thereof, any derivatives thereof, and any combinations thereof. In some embodiments, these moieties may be characterized by a lower critical solution temperature (LCST) property. In some cases, hydrophobic moieties with this property may become less compatible with water when exposed to increased temperatures, which may lead to their association and/or formation of polymer networks that alter the rheological properties of the fluid. The hydrophobic moieties may be attached onto the polymer backbone at any location. In some embodiments, the hydrophobic moieties may be grafted or otherwise dispersed along a substantial portion of the polymer backbone, e.g., in a uniform or non-uniform distribution. In some embodiments, the hydrophobic moieties may be attached to one or both ends of the polymer backbone, e.g., to form a telechelic or semitelechelic polymer. In some embodiments, the hydrophobic moieties at random locations or at locations targeted in synthesizing those polymers. Any suitable amount of hydrophobic moieties may be attached to the water soluble polymer backbone. In some embodiments, a thermoassociative polymer of the present disclosure may include hydrophobic moieties attached thereto in an amount of from about 0.1 mol % to about 10 mol %. In some embodiments, a thermoassociative polymer of the present disclosure may include hydrophobic moieties attached thereto in an amount of from about 2 mol % to about 8 mol %. In some embodiments, a thermoassociative polymer of the present disclosure may include hydrophobic moieties attached thereto in an amount of from about 3 mol % to about 5 mol %.

In some embodiments, the amount and nature of hydrophobic moieties attached to the polymer backbone may be selected to control the temperature at which the polymers exhibit thermoassociation and begin to alter rheological properties (e.g., enhance the viscosity) of the treatment fluid in which they are included. For example, hydrophobic moieties that consist of relatively long molecules may produce polymers that exhibit thermoassociation and begin to alter rheological properties (e.g., enhance the viscosity) of a treatment fluid at lower temperatures than thermoassociative polymers that include the same polymer backbone but shorter hydrophobic moieties attached thereto.

The thermoassociative polymers of the present disclosure may be synthesized or otherwise provided by any suitable means. In some embodiments, the polymers may be synthesized via a coupling reaction between one or more reactive groups on the polymer backbone (e.g., a carboxyl group on a polysaccharide) and one or more reactive groups on the hydrophobic moiety (e.g., an amine on an amino-terminated poly(ethylene oxide-co-propylene oxide). In some embodiments, such coupling reactions may take place in one or more solvents, and optionally in the presence of one or more coupling agents, such as 1-(3-(dimethylamino) propyl)-3-ethyl carbodiimide hydrochloride (EDC), N-hydroxysuccinimide (NHS), and the like. The water soluble polymer backbone and the hydrophobic moieties may be reacted in any suitable ratios. In some embodiments, the ratio of the amount of water soluble polymer to the amount of the hydrophobic moieties may range from about 1:1 to about 4:1 by weight.

An example of one process for synthesizing thermoassociative polymers of the present disclosure may proceed by dissolving a water soluble polymer in water for at least 24 h at room temperature in a reaction vessel equipped with a magnetic stirrer. The hydrophobic moiety may be separately dissolved in water to get a homogeneous solution, and the pH of that solution optionally may be adjusted (e.g., to around 5-6 using a strong acid). The polymer solution may be cooled and the solution of the hydrophobic moiety may be added to it, during which the pH also may be adjusted. After a period of mixing, one or more coupling agents may be dissolved in water and then slowly added into the reaction vessel, after which the reaction may be allowed to proceed further over a period of several hours. The thermoassociative polymer then may be precipitated under stirring in an organic solvent (e.g., ethanol). In some embodiments, the precipitated polymer may be washed (e.g., to remove unreacted reagents and byproducts), filtered off, and/or dried under vacuum. Other suitable processes for synthesizing thermoassociative polymers of the present disclosure may include coupling, grafting, precipitation, inverse emulsion polymerization, post polymerization functionalization, copolymerization, and combinations of those processes.

The treatment fluids used in the methods and compositions of the present disclosure may include any aqueous base fluid known in the art and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), brackish water, seawater, produced water (e.g., water produced from the same formation where the method of the present disclosure is being conducted), or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of polymers, nanoparticles, and/or other additives included in the fluid. One of ordinary skill in the art, with the benefit of this disclosure, will recognize when such density and/or pH adjustments are appropriate. In certain embodiments, the treatment fluids may include a mixture of one or more base fluids and/or gases, including but not limited to emulsions, foams, and the like.

The thermoassociative polymers of the present disclosure may be included in the treatment fluid in any suitable amount, inter alia, to impart the desired rheological properties to that fluid. In some embodiments, the thermoassociative polymer(s) may be included in a treatment fluid in an amount of from about 0.01% to about 5% by weight of the fluid. In some embodiments, the thermoassociative polymer(s) may be included in a treatment fluid in an amount of from about 0.5% to about 3% by weight of the fluid. In some embodiments, the thermoassociative polymer(s) may be included in a treatment fluid in an amount of from about 0.1% to about 0.5% by weight of the fluid. In some embodiments, the thermoassociative polymer(s) may be included in a treatment fluid in an amount of less than about 2%, or less than about 1%, or less than about 0.5%, each by weight of the fluid.

In certain embodiments, the treatment fluids of the present disclosure may include a tuning additive that is selected, inter alia, to increase or decrease the temperature at which the polymers exhibit thermoassociation and begin to alter rheological properties (e.g., enhance the viscosity) (association temperature or $T_{assoc}$) to a higher or lower temperature (i.e., $T_{assoc}'$). In certain embodiments, the tuning additive may include one or more surfactants, one or more water soluble salts, or a combination thereof. Examples of water soluble salts that may be suitable include, but are not limited to, potassium chloride, calcium chloride, potassium bromide, calcium bromide, sodium chloride, sodium bromide, and the like. In some embodiments, the addition of a water soluble salt may decrease the association temperature of the thermoassociative polymer. Other examples of tuning additives may include, but are not limited to, solvents, pH adjusting additives, and hydrophobes.

The surfactants used as tuning additives may include any surfactants known in the art, including cationic, anionic, nonionic, and/or zwitterionic surfactants. Anionic surfactants that may be suitable include, but are not limited to alkali salts of acids, alkali salts of fatty acids, alkaline salts of acids, sodium salts of acid, sodium salts of fatty acid, alkyl sulphates, alkyl ethoxylate, sulphates, sulfonates, soaps, and any combination thereof. Examples of suitable anionic surfactants that may be suitable include, but are not limited to sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, sodium dodecyl sulfate, any derivative thereof, and any combination thereof. Cationic surfactants that may be suitable include, but are not limited to arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, quaternary ammonium compounds, alkyl propoxy-ethoxysulfonate, alkyl propoxy-ethoxysulfate, alkylaryl-propoxy-ethoxysulfonate, any derivatives thereof, and any combinations thereof. Depending on the nature of the surfactant used, the surfactant may increase or decrease the association temperature of the thermoassociative polymers. For example, an anionic surfactant may increase the association temperature of the thermoassociative polymers, while a cationic surfactant may decrease the association temperature. In some embodiments, a larger amount of the tuning additive may cause a larger increase or decrease in the association temperature of the polymers. A person of skill in the art, with the benefit of this disclosure, will be able to ascertain a suitable amount of the tuning additive to achieve the desired increase or decrease in association temperature for a particular application of the methods of the present disclosure.

In certain embodiments, the treatment fluids used of the present disclosure optionally may include any number of additional additives. Examples of such additional additives include, but are not limited to, additional salts, additional surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, additional viscosifiers, breakers (e.g., enzymes, oxidizers, etc.), weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application. In some embodiments, the fluids of the present disclosure may be substantially or entirely free of additional viscosifiers, crosslinking agents, breakers, and/or any of the other optional additives listed above.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the thermoassociative polymers and/or other components of the treatment fluid may be metered directly into a base treatment fluid to form a treatment fluid. In certain embodiments, the base fluid may be mixed with the thermoassociative polymers, tuning additives, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the various components of the treatment fluids of the present disclosure may be mixed into the treatment fluid during some stages but not others. For example, the thermoassociative polymers may be continuously mixed into the treatment fluid, while optional tuning additives are only added in selected stages, among other reasons, to enhance the viscosity and/or other properties of the fluid only during those stages. In other embodiments, the optional tuning additives may be continuously mixed into the treatment fluid, while the thermoassociative polymers are only added in selected stages, among other reasons, to enhance the viscosity and/or other properties of the fluid only during those stages.

The present disclosure in some embodiments provides methods for using the treatment fluids to carry out a variety of subterranean treatments, including but not limited to, hydraulic fracturing treatments, acidizing treatments, drilling operations, enhanced oil recovery (EOR) operations, completion operations, and profile modification. The thermoassociative polymers of the present disclosure also may be useful in selectively reducing water permeability in sandstones, and/or as drag-reducing agents. In some embodiments, the treatment fluid such as a drilling fluid of the present disclosure may be introduced into at least a portion of a well bore as it is drilled to penetrate at least a portion of a subterranean formation. The drilling fluid may be circulated in the well bore during drilling, among other reasons, to cool and/or lubricate a drill bit and/or drill pipe to prevent them from sticking to the walls of the wellbore, prevent blowouts by serving as a hydrostatic head to counteract the sudden entrance into the well bore of high pressure formation fluids, suspend or remove formation cuttings from the well bore, and/or enhance the stability of the well bore during drilling.

In some embodiments, drilling fluids of the present disclosure that include thermoassociative polymers may exhibit enhanced lost circulation control and/or rheological properties in high temperature zones of the formation, even as compared to lower temperature zones in the same formation. In some embodiments, the $T_{assoc}$ of the thermoassociative polymers may be tuned or controlled (e.g., with the addition of salts and/or surfactants) based on, inter alia, the temperatures in one or more zones in the formation in which the drilling fluid will be used.

In some embodiments, a treatment fluid of the present disclosure may be introduced (e.g., pumped) into a particular portion of a subterranean formation or well bore, e.g., as a pill to treat only that portion. For example, a treatment fluid pill of the present disclosure may be pumped into the well bore while having an initial viscosity that is relatively low (e.g., below about 10 cP), and then the viscosity of the pill may increase when it reaches the desired location (e.g., a fracture or other region into which fluids may be lost) and is exposed to higher temperatures therein. In some embodiments, the viscosified pill may form a plug in that portion of the formation or well bore, which may divert fluids away from that location and/or reduce the loss of fluid therein.

Figure 3:
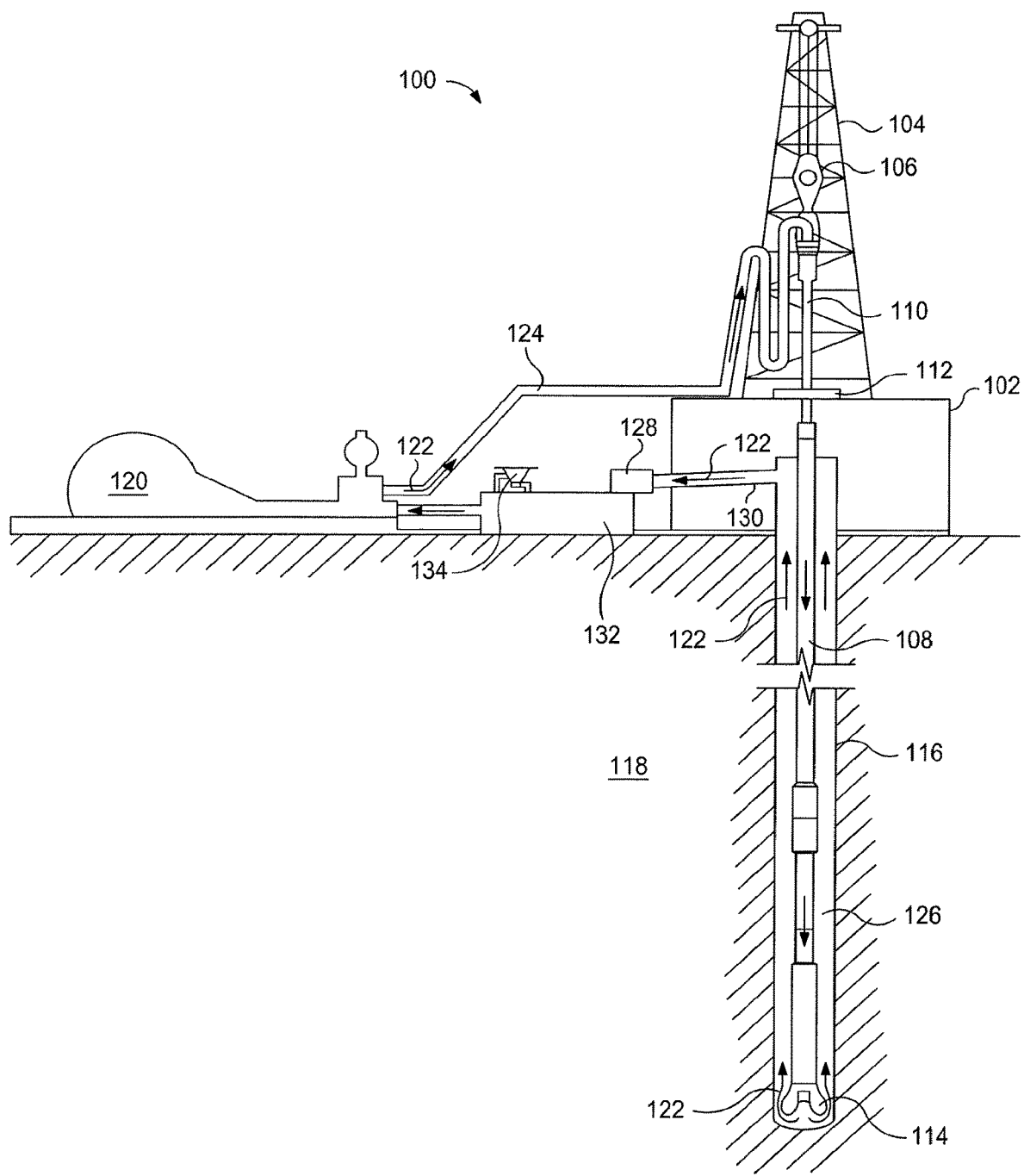
FIG. 3 is a diagram illustrating an example of a well bore drilling assembly that may be used in accordance with certain embodiments of the present disclosure.

The treatment fluids and additives disclosed herein may directly or indirectly affect one or more components or pieces of equipment associated with the preparation, delivery, recapture, recycling, reuse, and/or disposal of the disclosed treatment fluids and additives. For example, and with reference to FIG. 3, the disclosed treatment fluids and additives may directly or indirectly affect one or more components or pieces of equipment associated with a wellbore drilling assembly 100, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids and/or additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed thermoassociative polymers may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed treatment fluids and/or additives may be stored, reconditioned, and/or regulated until added to the drilling fluid 122.

As mentioned above, the disclosed treatment fluids and/or additives may directly or indirectly affect the components and equipment of the drilling assembly 100. For example, the disclosed treatment fluids and/or additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the treatment fluids and/or additives.

The disclosed treatment fluids and/or additives may directly or indirectly affect the pump 120, which representatively includes any conduits, pipelines, trucks, tubulars, and/or pipes used to fluidically convey the treatment fluids and/or additives downhole, any pumps, compressors, or motors (e.g., topside or downhole) used to drive the treatment fluids and/or additives into motion, any valves or related joints used to regulate the pressure or flow rate of the treatment fluids and/or additives, and any sensors (i.e., pressure, temperature, flow rate, etc.), gauges, and/or combinations thereof, and the like. The disclosed treatment fluids and/or additives may also directly or indirectly affect the mixing hopper 134 and the retention pit 132 and their assorted variations.

The disclosed treatment fluids and/or additives may also directly or indirectly affect the various downhole equipment and tools that may come into contact with the treatment fluids and/or additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluids and/or additives may also directly or indirectly affect any downhole heat exchangers, valves and corresponding actuation devices, tool seals, packers and other wellbore isolation devices or components, and the like associated with the wellbore 116. The disclosed treatment fluids and/or additives may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids and/or additives may also directly or indirectly affect any transport or delivery equipment used to convey the treatment fluids and/or additives to the drilling assembly 100 such as, for example, any transport vessels, conduits, pipelines, trucks, tubulars, and/or pipes used to fluidically move the treatment fluids and/or additives from one location to another, any pumps, compressors, or motors used to drive the treatment fluids and/or additives into motion, any valves or related joints used to regulate the pressure or flow rate of the treatment fluids and/or additives, and any sensors (i.e., pressure and temperature), gauges, and/or combinations thereof, and the like.

An embodiment of the present disclosure is a method that includes: providing a treatment fluid that includes an aqueous base fluid, one or more polymers that include a water soluble polymeric backbone having one or more hydrophobic moieties attached to the polymer backbone, wherein the polymer exhibits thermoassociation at a first temperature $T_{assoc}$, and one or more tuning additives that changes the temperature at which at least one of the polymers exhibits thermoassociation from $T_{assoc}$ to a second temperature $T_{assoc}'$; and introducing the treatment fluid into a portion of a subterranean formation.

In one or more embodiments described in the preceding paragraph, the polymeric backbone is selected from the group consisting of: guar, tamarind, a polyacrylate, a polyacrylamide, a polyanhydride, a polyether, a polyester, a polyamide, a polyvinylalcohol, a polysaccharide, an alginate, a cellulose, any copolymer thereof, any derivative thereof, and any combination thereof. In one or more embodiments described above, the polymeric backbone is tamarind or a tamarind derivative. In one or more embodiments described above, the one or more hydrophobic moieties are selected from the group consisting of: poly(ethylene oxide-co-propylene oxide) (PEPO), poly(N-isopropylacrylamide), poly(N,N-diethylacrylamide), poly(ethylene oxide) (PEO), poly(propylene oxide) (PPO), polyvinylmethylether (PVME), poly(acrylic acid)-g-poly(ethylene oxide), poly(acrylic acid)-g-poly(N-isopropylacrylamide), poly(N-vinylcaprolactam), poly(pentapeptides) of elastin, poly(acrylic acid) (PAA), polyacrylamide (PAAm), poly(acrylamide-co-butyl methacrylate), poly(2-(dimethylamino)ethyl methacrylate), poly(methyl vinyl ether), poly(N-vinylcaprolactam), polyampholytes, poly(2-(dimethylamino)ethyl methacrylate) (PDMAEMA), any copolymer thereof, any derivative thereof, and any combination thereof. In one or more embodiments described above, the one or more hydrophobic moieties include poly(ethylene oxide-co-propylene oxide). In one or more embodiments described above, the tuning additive is a water soluble salt. In one or more embodiments described above, the tuning additive is a surfactant. In one or more embodiments described above, the treatment fluid is a fluid loss pill. In one or more embodiments described above, $T_{assoc}$ is greater than $T_{assoc}'$. In one or more embodiments described above, $T_{assoc}$ is less than $T_{assoc}'$.

Another embodiment of the present disclosure is a method that includes: providing a drilling fluid that includes an aqueous base fluid, one or more polymers that include a water soluble polymeric backbone having one or more hydrophobic moieties attached to the polymer backbone wherein the polymer exhibits thermoassociation at a first temperature $T_{assoc}$, and one or more tuning additives that changes the temperature at which at least one of the polymers exhibits thermoassociation from $T_{assoc}$ to a second temperature $T_{assoc}'$; and using the treatment fluid to drill at least a portion of a well bore in a portion of a subterranean formation.

In one or more embodiments described in the preceding paragraph, the polymeric backbone is tamarind or a tamarind derivative. In one or more embodiments described above, the one or more hydrophobic moieties include poly(ethylene oxide-co-propylene oxide). In one or more embodiments described above, the tuning additive is a water soluble salt. In one or more embodiments described above, the tuning additive is a surfactant. In one or more embodiments described above, $T_{assoc}$ is greater than $T_{assoc}'$. In one or more embodiments described above, $T_{assoc}$ is less than $T_{assoc}'$.

Another embodiment of the present disclosure is a method that includes: providing a treatment fluid that includes an aqueous base fluid, one or more polymers that include a water soluble polymeric backbone having one or more hydrophobic moieties attached to the polymer backbone, and one or more tuning additives selected from the group consisting of: a water soluble salt, a surfactant, a solvent, a pH adjusting additive, a hydrophobe, and any combination thereof; and introducing the treatment fluid into a portion of a subterranean formation.

In one or more embodiments described in the preceding paragraph, the polymeric backbone is tamarind or a tamarind derivative. In one or more embodiments described above, the one or more hydrophobic moieties include poly(ethylene oxide-co-propylene oxide).

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

A fluid sample 1A was prepared in fresh water, to which 1 wt % of a thermoassociative polymer with a carboxymethyl guar backbone and poly(ethylene oxide-co-propylene oxide) groups grafted thereon was added. Fluid samples 1B and 1C were prepared in fresh water containing 1 wt % of the same thermoassociative polymer from fluid sample 1A, but also adding potassium chloride salt (0.6M concentration) to fluid sample 1B and 0.5 wt % of a sodium dodecyl sulfate surfactant to fluid sample 1C. The storage modulus (G'), loss modulus (G"), and complex viscosity ($\eta^*$) of each sample was measured as a function of temperature to determine $T_{assoc}$. Viscosity measurements were taken using an Anton Paar MCR-301, controlled stress rheometer. Frequency sweep experiments were performed in the linear regime to determine G' and G" in the frequency range of 0.01-100 Hz (rad/s). Those measurements are plotted in FIG. 1. As shown, the addition of potassium chloride salt in Fluid Sample 1B decreased $T_{assoc}$ from 42° C. to 29° C., while the addition of the surfactant in Fluid Sample 1C increased $T_{assoc}$ from 42° C. to 52° C.

Example 2

Figure 2:
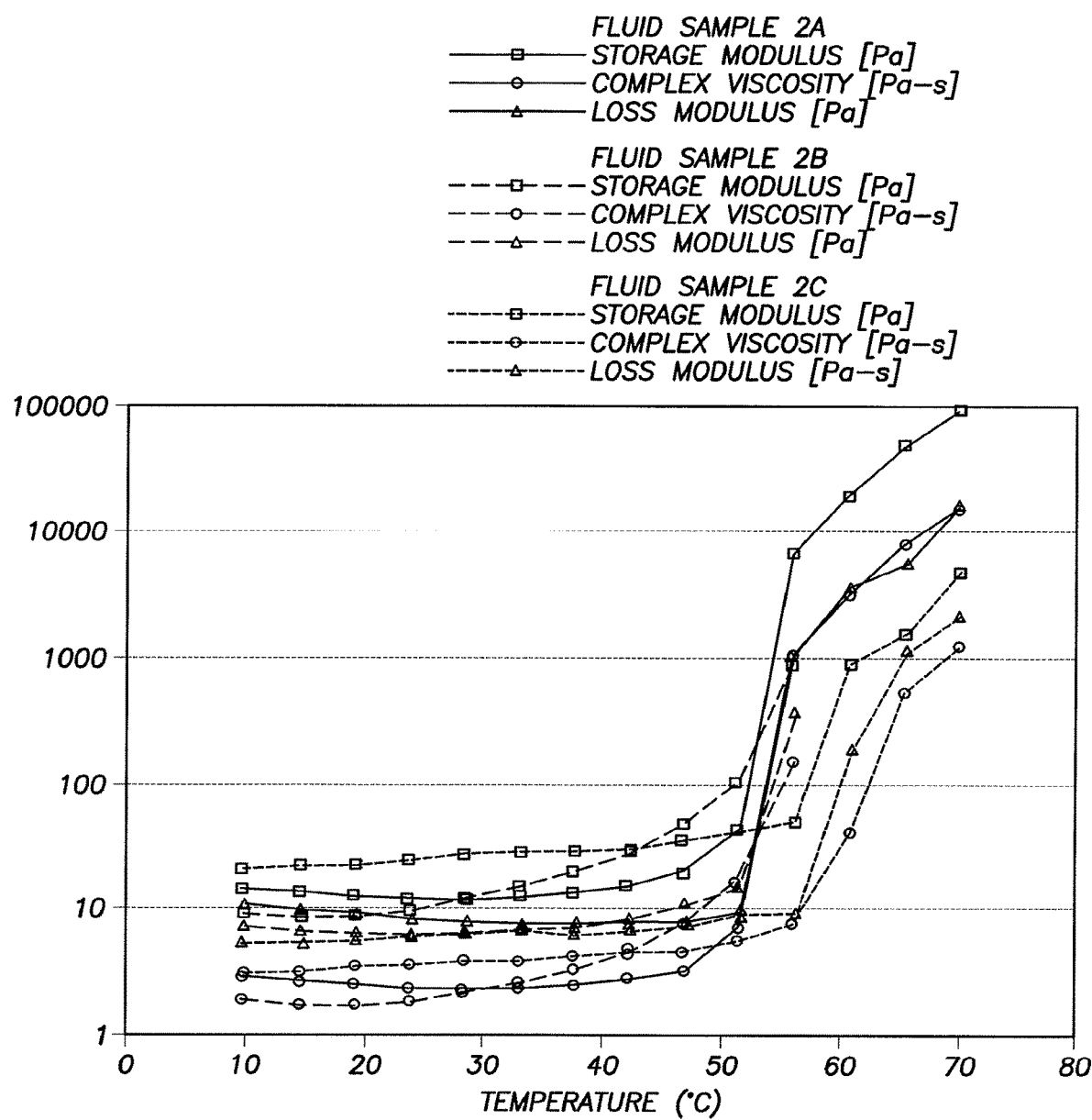
FIG. 2 is a graph illustrating data from tests of rheological properties of treatment fluids containing carboxymethyl tamarind-based thermoassociative polymers according to certain embodiments of the present disclosure.

A fluid sample 2A was prepared in fresh water, to which 2 wt % of a thermoassociative polymer with a carboxymethyl tamarind backbone and poly(ethylene oxide-co-propylene oxide) groups grafted thereon was added. Fluid samples 2B and 2C were prepared in fresh water containing 2 wt % of the same thermoassociative polymer from fluid sample 2A, but also adding potassium chloride salt (0.6M concentration) to fluid sample 2B and 0.5 wt % of a sodium dodecyl sulfate surfactant to fluid sample 2C. The storage modulus (G'), loss modulus (G"), and complex viscosity ($\eta^*$) of each sample was measured as a function of temperature to determine $T_{assoc}$. Viscosity measurements were taken using an Anton Paar MCR-301, controlled stress rheometer. Frequency sweep experiments were performed in the linear regime to determine G' and G" in the frequency range of 0.01-100 Hz (rad/s). Those measurements are plotted in FIG. 2. As shown, the addition of potassium chloride salt in Fluid Sample 2B decreased $T_{assoc}$ from 47° C. to 33° C., while the addition of the surfactant in Fluid Sample 2C increased $T_{assoc}$ from 47° C. to 56° C.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid that comprises
an aqueous base fluid,
one or more polymers that comprise a water soluble polymeric backbone having one or more hydrophobic moieties attached to the polymer backbone, wherein the polymer exhibits thermoassociation at a first temperature $T_{assoc}$, and
one or more tuning additives that changes the temperature at which at least one of the polymers exhibits thermoassociation from $T_{assoc}$ to a second temperature $T_{assoc}'$, wherein at least one of the one or more tuning additives is an anionic surfactant and $T_{assoc}$ is less than $T_{assoc}'$, or wherein at least one of the one or more tuning additives is a cationic surfactant and $T_{assoc}$ is greater than $T_{assoc}'$, or wherein at least one of the one or more tuning additives is a water soluble salt selected from the group consisting of potassium bromide, calcium bromide, sodium bromide, and any combination thereof and $T_{assoc}$ is greater than $T_{assoc}'$; and
introducing the treatment fluid into a portion of a subterranean formation.

2. The method of claim 1 wherein the polymeric backbone is selected from the group consisting of: guar, tamarind, a polyacrylate, a polyacrylamide, a polyanhydride, a polyether, a polyester, a polyamide, a polyvinylalcohol, a polysaccharide, an alginate, a cellulose, any copolymer thereof, any derivative thereof, and any combination thereof.

3. The method of claim 1 wherein the polymeric backbone is tamarind or a tamarind derivative.

4. The method of claim 1 wherein the one or more hydrophobic moieties are selected from the group consisting of: poly(ethylene oxide-co-propylene oxide) (PEPO), poly(N-isopropylacrylamide), poly(N,N-diethylacrylamide), poly(ethylene oxide) (PEO), poly(propylene oxide) (PPO), polyvinylmethylether (PVME), poly(acrylic acid)-g-poly (ethylene oxide), poly(acrylic acid)-g-poly(N-isopropylacrylamide), poly(N-vinylcaprolactam), poly(pentapeptides) of elastin, poly(acrylic acid) (PAA), polyacrylamide (PAAm), poly(acrylamide-co-butyl methacrylate), poly(2-(dimethylamino)ethyl methacrylate), poly(methyl vinyl ether), poly(N-vinylcaprolactam), polyampholytes, poly(2-(dimethylamino)ethyl methacrylate) (PDMAEMA), any copolymer thereof, any derivative thereof, and any combination thereof.

5. The method of claim 1 wherein the one or more hydrophobic moieties comprise poly(ethylene oxide-co-propylene oxide).

6. The method of claim 1 wherein at least one of the one or more tuning additives is the water soluble salt and $T_{assoc}$ is greater than $T_{assoc}'$.

7. The method of claim 1 wherein the treatment fluid is a fluid loss pill.

8. The method of claim 1 wherein at least one of the one or more tuning additives is the cationic surfactant and $T_{assoc}$ is greater than $T_{assoc}'$.

9. The method of claim 1 wherein at least one of the one or more tuning additives is the anionic surfactant and $T_{assoc}$ is less than $T_{assoc}'$.

10. The method of claim 1 wherein the one or more tuning additives further comprises at least one of a solvent, a pH adjusting additive, and a hydrophobe.

11. A method comprising:
providing a drilling fluid that comprises
an aqueous base fluid,
one or more polymers that comprise a water soluble polymeric backbone having one or more hydrophobic moieties attached to the polymer backbone, wherein the polymer exhibits thermoassociation at a first temperature $T_{assoc}$, and
one or more tuning additives that changes the temperature at which at least one of the polymers exhibits thermoassociation from $T_{assoc}$ to a second temperature $T_{assoc}'$, wherein at least one of the one or more tuning additives is an anionic surfactant and $T_{assoc}$ is less than $T_{assoc}'$, or wherein at least one of the one or more tuning additives is a cationic surfactant and $T_{assoc}$ is greater than $T_{assoc}'$, or wherein at least one of the one or more tuning additives is a water soluble salt selected from the group consisting of potassium bromide, calcium bromide, sodium bromide, and any combination thereof and $T_{assoc}$ is greater than $T_{assoc}'$; and
using the treatment fluid to drill at least a portion of a well bore in a portion of a subterranean formation.

12. The method of claim 11 wherein the polymeric backbone is tamarind or a tamarind derivative.

13. The method of claim 11 wherein the one or more hydrophobic moieties comprise poly(ethylene oxide-co-propylene oxide).

14. The method of claim 11 wherein at least one of the one or more tuning additives is the water soluble salt and $T_{assoc}$ is greater than $T_{assoc}'$.

15. The method of claim 11 wherein at least one of the one or more tuning additives is the cationic surfactant and $T_{assoc}$ is greater than $T_{assoc}'$.

16. The method of claim 11 wherein at least one of the one or more tuning additives is the anionic surfactant and $T_{assoc}$ is less than $T_{assoc}'$.

17. A method comprising:
providing a treatment fluid that comprises
an aqueous base fluid,
one or more polymers that comprise a water soluble polymeric backbone having one or more hydrophobic moieties attached to the polymer backbone, wherein the polymeric backbone is selected from the group consisting of: guar, tamarind, a polyacrylate, a polyacrylamide, a polyanhydride, a polyether, a polyester, a polyamide, a polyvinylalcohol, a polysaccharide, an alginate, a cellulose, any copolymer thereof, any derivative thereof, and any combination thereof, and
one or more tuning additives selected from the group consisting of: a water soluble salt, a surfactant, a solvent, a pH adjusting additive, a hydrophobe, and any combination thereof that changes the temperature at which at least one of the polymers exhibits thermoassociation from $T_{assoc}$ to a second temperature $T_{assoc}'$, wherein at least one of the one or more tuning additives is an anionic surfactant and $T_{assoc}$ is less than $T_{assoc}'$, or wherein at least one of the one or more tuning additives is a cationic surfactant and $T_{assoc}$ is greater than $T_{assoc}'$, or wherein at least one of the one or more tuning additives is a water soluble salt selected from the group consisting of potassium bromide, calcium bromide, sodium bromide, and any combination thereof and $T_{assoc}$ is greater than $T_{assoc}'$; and
introducing the treatment fluid into a portion of a subterranean formation.

18. The method of claim 17 wherein the polymeric backbone is tamarind or a tamarind derivative.

19. The method of claim 17 wherein the one or more hydrophobic moieties comprise poly(ethylene oxide-co-propylene oxide).

* * * * *